C. R. Hurlbut,
Turning Regular Forms.
Nº 8,355.   Patented Sep. 9, 1851.
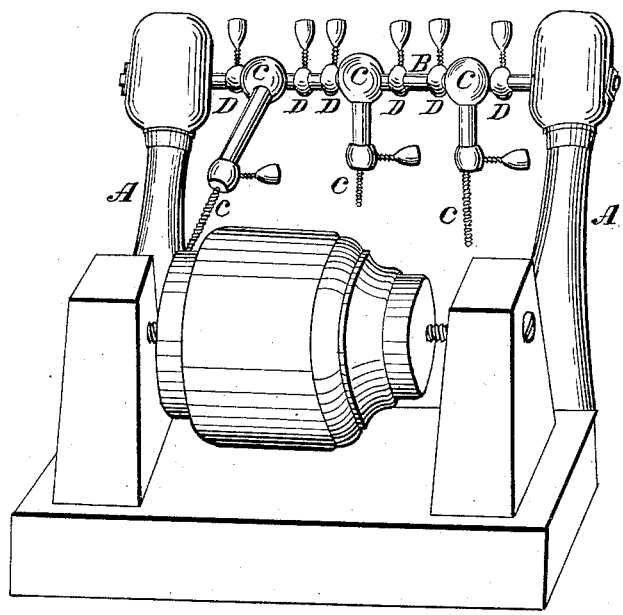

UNITED STATES PATENT OFFICE.

C. R. HURLBUT, OF WAUKAU, WISCONSIN.

GAGE USED IN TURNING.

Specification of Letters Patent No. 8,355, dated September 9, 1851.

*To all whom it may concern:*

Be it known that I, CHAUNCEY R. HURLBUT, of Waukau, in the county of Winnebago and State of Wisconsin, have invented a new and useful Machine for Gaging Articles while being Turned in a Lathe, which I have named the "Graduated Suspension-Gage;" and I do hereby declare that the following is a full, clear, and exact description of the same, reference being had to the annexed drawing, making a part of this specification.

I affix two posts (A) to the lathe in such a manner as to allow a wire (B) to be stretched between them, behind and exactly parallel to the shears. Upon this wire I suspend the gages (C) by passing it through the end of the stock, so as to allow the gages to swing freely upon the wire, without any lateral motion.

The clamps (D) are for the purpose of setting and keeping the gages opposite the points to be measured. The gage is made in two parts, a stock (C) attached at one end to the wire as above described and having at its other end a graduated slide (e) so as to allow its length to be varied at pleasure.

The manner of using the machine is as follows, viz: The gages are first set upon the wire opposite the points to be measured, the slides are then fixed at the division corresponding with the required diameter, then after the article to be turned is partially rounded, the gages are swung over so as to allow their points to rest upon it, and is turned down until the gage drops from it.

What I claim as my invention, and desire to secure by Letters Patent, is—

The gage (C) with its graduated slide (c) capable of being set to any given diameter, the whole being suspended upon a horizontal wire and operating as herein set forth.

C. R. HURLBUT.

Witnesses:
S. W. HALL,
WM. H. ELLIOTT.